(12) United States Patent
Mays (10) Patent No.: US 9,371,133 B2
(45) Date of Patent: Jun. 21, 2016

(54) DRONE SYSTEMS FOR PRE-TRIP INSPECTION AND ASSISTED BACKING

(71) Applicant: Wesley Mays, Coppell, TX (US)

(72) Inventor: Wesley Mays, Coppell, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/536,446

(22) Filed: Nov. 7, 2014

(65) Prior Publication Data

US 2016/0129999 A1    May 12, 2016

(51) Int. Cl.
*B64C 39/02* (2006.01)
*G05D 1/00* (2006.01)
*B60R 1/00* (2006.01)

(52) U.S. Cl.
CPC ............... *B64C 39/024* (2013.01); *B60R 1/00* (2013.01); *G05D 1/0038* (2013.01); *G05D 1/0088* (2013.01); *B60R 2300/802* (2013.01); *B64C 2201/127* (2013.01); *B64C 2201/141* (2013.01); *B64C 2201/146* (2013.01)

(58) Field of Classification Search
CPC ............ B64C 39/024; B64C 2201/141; B64C 2201/146; B64C 2201/127; G05D 1/0038; G05D 1/0088; B60R 1/00; B60R 2300/802
USPC ............................................................. 701/2
See application file for complete search history.

(56) References Cited

U.S. PATENT DOCUMENTS

| 8,060,270 | B2 | 11/2011 | Vian |
| 8,194,822 | B2 | 6/2012 | Rothschild |
| 8,346,578 | B1 | 1/2013 | Hopkins, III |
| 8,474,161 | B2 | 7/2013 | Cunningham |
| 8,567,718 | B1 | 10/2013 | McDonnell |
| 8,982,207 | B2 * | 3/2015 | Jang ...................... B64F 5/0045 348/125 |
| 9,129,528 | B2 * | 9/2015 | Lavoie ................. G08G 1/0962 |
| 2006/0145024 | A1 * | 7/2006 | Kosmas ............... B64G 1/1078 244/172.5 |
| 2010/0250022 | A1 * | 9/2010 | Hines .................... G05D 1/0094 701/2 |
| 2012/0136630 | A1 | 5/2012 | Murphy |
| 2013/0033381 | A1 | 2/2013 | Breed |
| 2013/0200207 | A1 | 8/2013 | Pongratz |
| 2013/0216089 | A1 | 8/2013 | Chen |
| 2015/0168719 | A1 * | 6/2015 | Kim ......................... B60R 1/00 345/7 |

FOREIGN PATENT DOCUMENTS

| WO | 99/33272 A1 | 7/1999 |
| WO | 2014/007873 A2 | 1/2014 |
| WO | 2014/080385 A2 | 5/2014 |

OTHER PUBLICATIONS

Bonnin-Pascual, F., et al., "Semi-Autonomous Visual Inspection of Vessels Assisted by an Unmanned Micro Aerial Vehicle," 2012 IEEE/RSJ International Conference on Intelligent Robots and Systems, Vilamoura, Algarve, Portugal, Oct. 7-12, 2012, 7 pages.

(Continued)

*Primary Examiner* — McDieunel Marc
*Assistant Examiner* — James E Stroud
(74) *Attorney, Agent, or Firm* — Christensen O'Connor Johnson Kindness PLLC (57) ABSTRACT

Embodiments relate to using a UAV for assisting drivers of large wheeled vehicles when backing up in reverse and for conducting pre-trip inspections of the wheeled vehicle prior to driving. The UAV can be a multirotor copter using simultaneous localization and mapping technology to maneuver autonomously. Alternatively, the driver of the wheeled vehicle may use remote control to maneuver the UAV.

22 Claims, 5 Drawing Sheets

(56) References Cited

OTHER PUBLICATIONS

"EasyJet to Use Unmanned Drones to Inspect Its Aircraft," theguardian.com, May 7, 2014 [retrieved Feb. 25, 2015], 3 pages.
Irizarry, J., and E.N. Johnson, "Final Report: Feasibility Study to Determine the Economic and Operational Benefits of Utilizing Unmanned Aerial Vehicles (UAVs)," Georgia DOT Research Project 12-38, Georgia Institute of Technology contract with Georgia Department of Transportation, May 6, 2014, 158 pages.
Irizarry, J., et al., "Usability Assessment of Drone Technology as Safety Inspection Tools," Journal of Information Technology in Construction (ITcon) 17:194-212, Sep. 2012.
"Phantom 2 Vision+," © 2014 DJI, <http://www.dji.com/product/phantom-2-vision-plus/feature> [retrieved Feb. 25, 2015], 7 pages.

* cited by examiner

| INSPECTION POINT | LOCATION | REQUIREMENTS TO PASS |
|---|---|---|
| HEADLIGHT | LOC 1 | REQ 1 |
| TURN SIGNAL | LOC 2 | REQ 2 |
| BRAKE LIGHT | LOC 3 | REQ 3 |
| BRAKE LINE | LOC 4 | REQ 4 |
| TIRE | LOC 5 | REQ 5 |
| ⋮ | ⋮ | ⋮ |

*Fig.6.*

DRONE SYSTEMS FOR PRE-TRIP INSPECTION AND ASSISTED BACKING

BACKGROUND

Operating and driving large vehicles is not like driving passenger cars. Large vehicles require additional training beyond the skills necessary to operate passenger vehicles and light duty trucks. A larger vehicle has greater blind spots, and the driver of a larger vehicle often cannot see what is directly behind the vehicle due to a trailer. Many times, the driver of a larger vehicle will have a person stand by the side of the vehicle to assist the driver when backing up in reverse.

A larger vehicle has a larger mass and more inertia at highway speeds. Thus, collisions with larger vehicles are more often fatal than collisions involving passenger cars. Larger vehicles, especially the larger class trucks used for commercial purposes, are often mandated to undergo periodic inspections, usually before every trip, to ensure that the vehicle is fully operational to minimize the possibility of collisions, break downs, and accidents. To date, most methods of vehicle inspection are done by a person, usually the driver. A driver can only walk around and visually inspect each of the inspection points on the vehicle to confirm that the vehicle is in proper working order prior to being driven.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a backup system for a wheeled vehicle includes a wheeled vehicle comprising a cab; an unmanned aerial vehicle comprising a camera; a controller configured to communicate to and from the unmanned aerial vehicle while in flight; a human machine interface within the cab, wherein the human machine interface is configured to communicate with the controller, and an electronic display device within the cab configured to display visual images sent from the unmanned aerial vehicle while in flight, and the controller is further configured to transmit input signals received via the human machine interface to the unmanned aerial vehicle, wherein the unmanned aerial vehicle is configured to maneuver autonomously or under driver remote control based on the input signals received from the human machine interface, and wherein the unmanned aerial vehicle is configured to send real-time video images while in flight from different viewing angles of a rear of the wheeled vehicle during a period when the wheeled vehicle is operating in reverse.

In some embodiments, the unmanned aerial vehicle comprises stereo vision cameras.

In some embodiments, the camera on the unmanned aerial vehicle is configured to be controlled via the human machine interface.

In some embodiments, the unmanned aerial vehicle is configured to maneuver autonomously while in flight.

In some embodiments, the unmanned aerial vehicle is configured to maneuver via driver remote control while in flight.

In some embodiments, the wheeled vehicle comprises a tractor and trailer.

In some embodiments, a method of backing up a wheeled vehicle includes deploying an unmanned aerial vehicle to take flight; maneuvering the unmanned aerial vehicle autonomously or under driver remote control to a rear of the wheeled vehicle; directing a camera onboard the unmanned aerial vehicle to capture images of a rear of the wheeled vehicle; and sending the images from the camera onboard the unmanned aerial vehicle to an electronic display device within a cab of the wheeled vehicle while the wheeled vehicle is operating in reverse.

In some embodiments, the method of backing up a wheeled vehicle further includes displaying on the electronic display device, distances to objects that appear in the images.

In some embodiments, the method of backing up a wheeled vehicle further includes maneuvering the unmanned aerial vehicle to maintain a constant distance to the wheeled vehicle.

In some embodiments, the method of backing up a wheeled vehicle further includes maneuvering the unmanned aerial vehicle to different sides of the wheeled vehicle.

In some embodiments, the method of backing up a wheeled vehicle further includes maintaining the unmanned aerial vehicle at a fixed position, and maneuvering the camera to maintain a rear of the wheeled vehicle within a field of view of the camera.

In some embodiments, an inspection system for a wheeled vehicle includes a wheeled vehicle comprising a cab; an unmanned aerial vehicle comprising a camera; a controller configured to communicate to and from the unmanned aerial vehicle while in flight; and a human machine interface within the cab, wherein the human machine interface is configured to communicate with the controller, and an electronic display device within the cab is configured to display visual images sent from the unmanned aerial vehicle while in flight, and the controller is further configured to transmit input signals received via the human machine interface to the unmanned aerial vehicle; and wherein the unmanned aerial vehicle is configured to maneuver autonomously or under driver remote control based on the input signals received from the human machine interface, and wherein the unmanned aerial vehicle is configured to send real-time video images while in flight of a plurality of inspection points located on the wheeled vehicle when the wheeled vehicle is in a parked condition, and wherein the plurality of inspection points relate to a condition affecting whether the wheeled vehicle is in a drivable condition.

In some embodiments, the wheeled vehicle comprises a tractor and trailer.

In some embodiments, the unmanned aerial vehicle comprises stereo vision cameras.

In some embodiments, the unmanned aerial vehicle comprises one or more instruments selected from infrared detectors, position-determining indicators, altimeters, gas detectors, global positioning systems, range detection lasers, ultrasonic range detectors, radio position detectors, and inertial measurement units.

In some embodiments, the unmanned aerial vehicle is configured to maneuver to the plurality of inspection points autonomously.

In some embodiments, the unmanned aerial vehicle is configured to maneuver to the plurality of inspection points under driver remote control.

In some embodiments, a method for inspecting a wheeled vehicle prior to driving the wheeled vehicle includes deploying an unmanned aerial vehicle to take flight; maneuvering the unmanned aerial vehicle autonomously or under driver remote control to a plurality of inspection points on the wheeled vehicle in sequence; after maneuvering the unmanned aerial vehicle to an inspection point, testing whether the inspection point is operational or not operational;

and after testing whether the inspection point is operational or not operational, maneuvering the unmanned aerial vehicle to another inspection point.

In some embodiments, the method of inspecting a wheeled vehicle further includes autonomously maneuvering the unmanned aerial vehicle.

In some embodiments, the method of inspecting a wheeled vehicle further includes remotely maneuvering the unmanned aerial vehicle.

In some embodiments, the method of inspecting a wheeled vehicle further includes logging results after testing whether the inspection point is operational or not operational.

In some embodiments, the method of inspecting a wheeled vehicle further includes preventing ignition of the wheeled vehicle until each of the inspection points is confirmed to be operational.

Accordingly, with the use of an unmanned aerial vehicle, the driver of the wheeled vehicle can avoid leaving the cab in areas that may be conducive to assaults, robberies, and hijackings, for example, or in extreme weather conditions. The driver can undertake the pre-trip inspection of the wheeled vehicle without leaving the safety or comfort of the cab. The system can save and log a video demonstrating a pre-trip inspection was performed on all the inspections points for later reference or to show compliance.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the use of an unmanned aerial vehicle (UAV) with a wheeled vehicle, such as a Class 8 truck. An unmanned aerial vehicle is also referred to as a "drone" in the literature. Generally, an unmanned aerial vehicle is any vehicle capable of flight without an onboard human pilot.

The detailed description set forth below in connection with the appended drawings where like numerals reference like elements is intended only as a description of various embodiments of the disclosed subject matter and is not intended to represent the only embodiments. Each embodiment described in this disclosure is provided merely as an example or illustration and should not be construed as preferred or advantageous over other embodiments unless expressly stated. The illustrative embodiments provided herein are not intended to be exhaustive or to limit the disclosure to the precise forms disclosed. Similarly, any steps described herein may be interchangeable with other steps, or combinations of steps, in order to achieve the same or substantially similar result.

Figure 1:
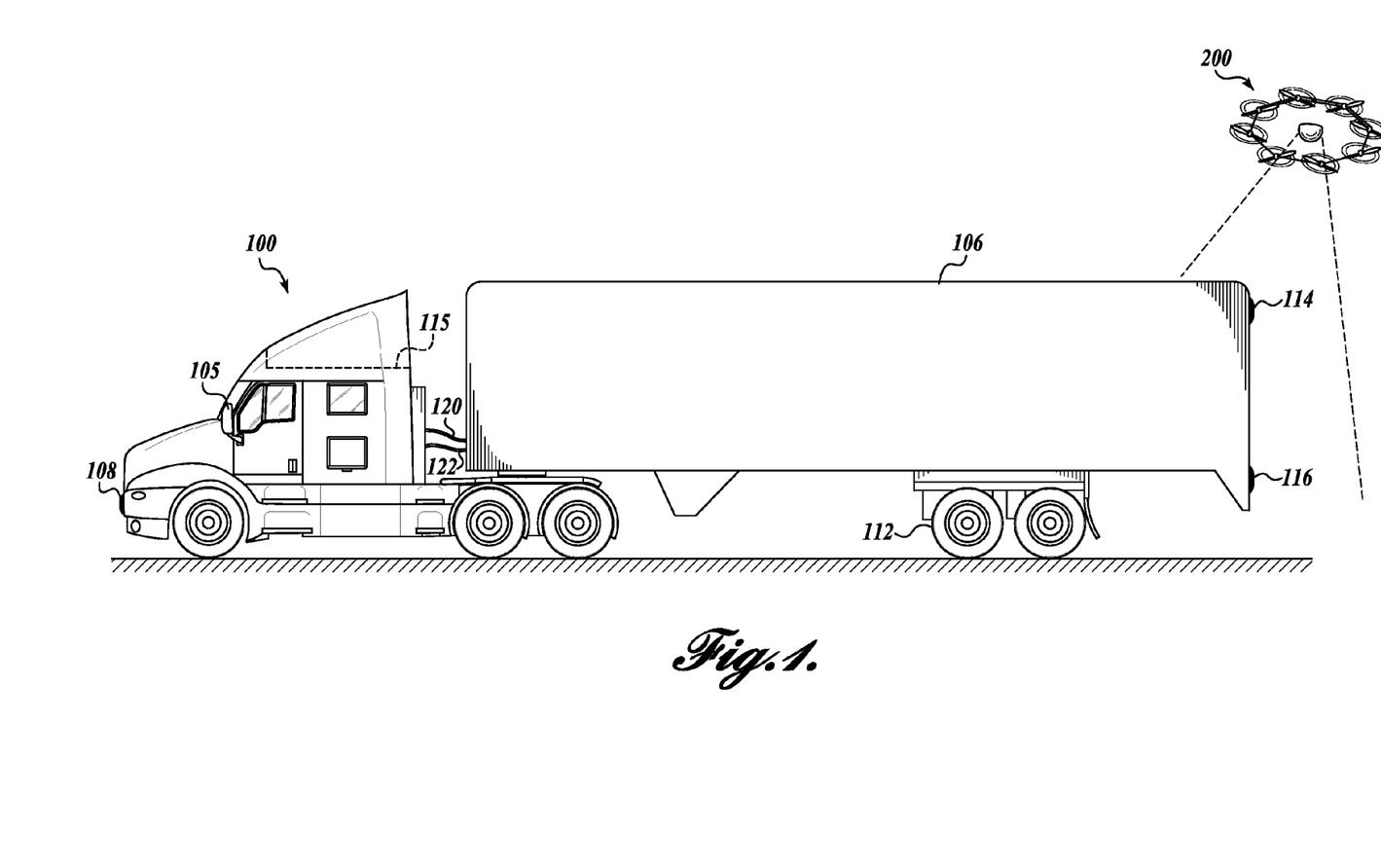
FIG. 1 is a diagrammatical illustration of a wheeled vehicle comprising a truck trailer combination and a UAV.

The following description proceeds with reference to examples of methods and systems for wheeled vehicles of a relatively large size, such as Class 8 trucks. However, the methods and systems can be used by wheeled vehicles of all sizes. It will be appreciated that aspects of the disclosed subject matter may also have wide application and, therefore, may be suitable for use with any type of vehicle, such as passenger vehicles, buses, light, medium, and heavy duty vehicles, boats, yachts, motor homes, etc. While FIG. 1 shows the wheeled vehicle includes a tractor and trailer, the embodiments may be applied to any vehicle. Accordingly, the following descriptions and illustrations herein should be considered illustrative in nature and, thus, not limiting the scope of the claimed subject matter.

Prior to discussing the details of various aspects of the present disclosure, it should be understood that several sections of the following description are presented in terms of "instructions" or "programs" that may be performed by conventional electronic components. These electronic components, which may be grouped in a single location or distributed over a wide area, generally include processors, memory, storage devices, display devices, input devices, etc. It will be appreciated by one skilled in the art that the instructions and programs described herein may be implemented in a variety of configurations, including but not limited to hardware, software, or a combination of hardware and software. In circumstances where the components are distributed, the components are accessible to each other via communication links.

As summarized above, embodiments of the present disclosure are generally directed to systems and methods for using a UAV 200 as a camera for assistance in backing up a wheeled vehicle in reverse and for conducting a pre-trip inspection of a wheeled vehicle prior to driving. A tractor trailer wheeled vehicle is schematically illustrated in FIG. 1. The tractor includes a driver's cab 100 with the controls housed inside. The tractor is configured to tow a trailer 106. A UAV 200 is shown in flight to the rear of the trailer 106. The UAV 200 is configured to serve as a backup assist camera or configured to perform a pre-trip inspection of the tractor and trailer, or configured for both backup assist and pre-trip inspection. In one embodiment, the tractor is configured to house the UAV 200 within a UAV storage bay 115. The UAV storage bay 115, for example, can be inside the aerodynamic wind deflection fairing on the roof of the cab 100. In this manner, the UAV 200 travels with the tractor and is ready to deploy in any case.

UAVs and the methods of their control either via remote pilots or autonomously by onboard instrumentation are well known in the art. Any one of a plurality of suitable UAVs 200 to use in the practice of the embodiments described herein can be selected based on the description herein.

Figure 2:
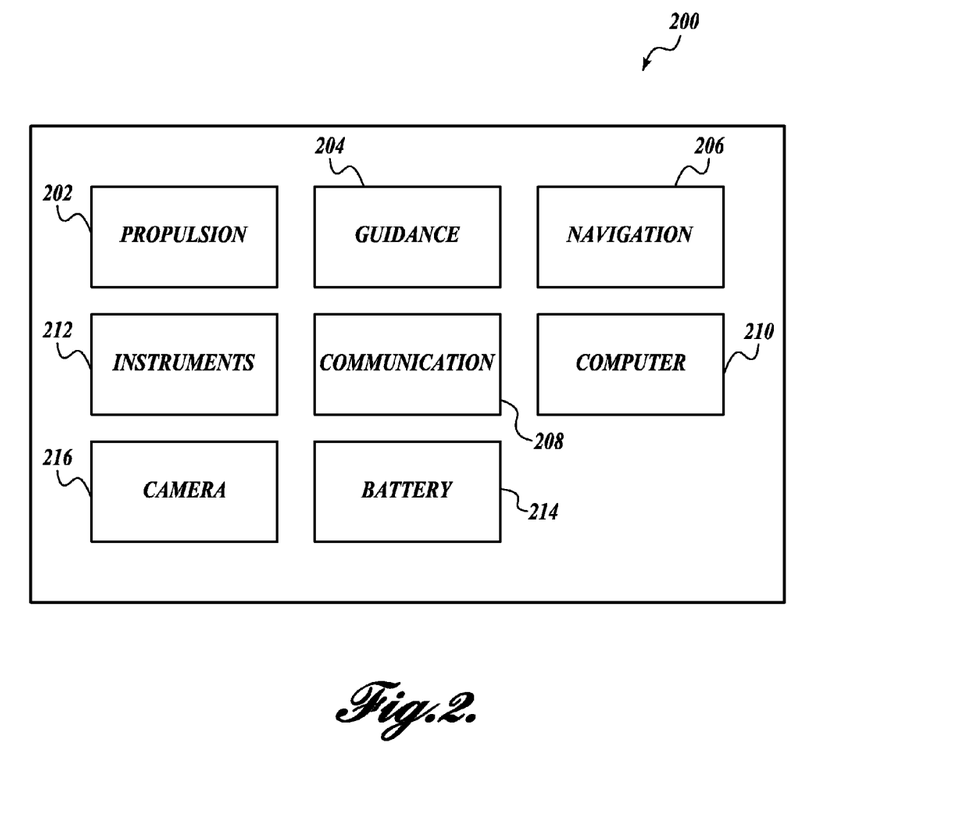
FIG. 2 is a schematic diagram showing the components of a UAV.

A suitable UAV 200 is schematically depicted in FIG. 2. It is to be appreciated that the illustration is merely schematic and meant to show major features of one embodiment of a UAV 200. In one embodiment, a UAV 200 may include a propulsion system 202, a guidance system 204, a navigation system 206, a communication system 208, a computer system 210 including processor and memory, instruments 212 (including, e.g., cameras, infrared detectors, position-determining indicators, altimeters, gas detectors, global positioning systems, lasers for range detection, ultrasonic range detectors, radio position detectors, and inertial measurement units), one or more cameras 216 for taking visual images, and a battery 214 to provide power to the onboard systems.

In one embodiment, the UAV 200 can be a rotary wing aircraft. For example, the UAV 200 can be a multirotor helicopter, such as a quadcopter, hexacopter, or octocopter, respectively having four, six, and eight rotors. The propellers are generally directed vertically. A multirotor copter has gained in popularity as the UAV 200 in many applications because of its relatively simple propulsion design. For navigation, the UAV 200 may be pilot (driver) remote controlled with the aid of the camera 216, or alternatively, the UAV 200 can have instrumentation to allow the UAV 200 to autonomously navigate. A combination of driver remote control/autonomous control may also be implemented.

The propulsion system 202 of the UAV 200 includes one or more propeller assemblies. The propellers can be battery operated. Propeller motors may employ a brushed or brushless motor design. Brushless motors may be more reliable as there are no brushes to wear and replace. The propellers can be 2, 3, or 4-bladed assemblies. Efficiency suffers the more blades that are on the propeller. However, more blades per propeller will deliver more power and produce less noise. Propeller size and pitch is matched to motor power and thrust requirements. Vibration should be minimized by balancing all propellers as well as isolating motors via vibration absorbing motor mounts. The UAV 200 multirotor copter can use fixed-pitch propeller blades for simplicity. A fixed-pitch propeller multirotor copter UAV 200 generally maneuvers by varying the thrust delivered from each of its propellers via an electronic speed controller. An electronic speed controller should be able to control the motor speeds of each motor to provide for accurately changing propeller speeds to provide more lift or change directions when desired. Suitable speed controllers should provide stability, i.e., the UAV 200 should be able to accurately maintain a position, such as by hovering, without too much drift or sideways motion.

For guidance and navigation, a driver remotely operated UAV 200 is simplest, since the driver views video images in real-time and navigates according to visually seeing the environment and obstacles in the UAV 200's path, and the driver is able to steer the UAV 200 to target destinations via use of the onboard camera. Autonomous guidance navigation is more complex, but a variety of systems are readily available for autonomous navigation. Autonomous navigation as used herein means that the UAV 200 is capable, by onboard instrumentation and processing, of recognizing its current position and the positions of other objects, recognizing the position of target destinations in relation to its own, and navigating a course to the target destination. Navigation systems may rely on global positioning system (GPS) navigation, accelerometers, stereo vision cameras, laser scanning, and inertial sensors. In some embodiments, the UAV 200 will be able to recreate a 3-D environment based on the use of stereo vision cameras or laser scanning. A stereo vision camera can use charge-coupled device (CCD) cameras. A program operating on the onboard computer of the unmanned aerial vehicle can extract 3-D information from the images gathered by the CCD cameras to create the 3-D environment. An autonomous navigation system can rely on the use of stereo vision or 3-D laser scanning. In some embodiments, as the UAV 200 takes flight, the UAV 200 may create a map of its environment including the wheeled vehicle in real time. Based on the created map, the UAV 200 can recognize distances to objects and may also recognize certain objects. For example, the UAV 200 may be able to recognize the tractor and the trailer. The UAV 200 may also store a pre-programmed map of the tractor or trailer. The UAV 200 will be able to determine its position in relation to the pre-programmed map. The pre-programmed map of the trailer can also have instructions relating to certain locations from which the UAV 200 can determine how to navigate. From the map created by the UAV 200, the UAV 200 can determine the current position, locate the current position to a corresponding position on the pre-programmed map, and then be able to navigate to each one or more of the target destinations located on the pre-programmed map.

For a driver remote controlled UAV 200, the driver can simply navigate based on the real-time video images taken by an onboard UAV camera 216

The computer system 210 includes a memory and processor. The memory can store instructions that when executed by the processor allow the UAV 200 to perform various functions. The UAV 200, for example, is able to control altitude via speed controllers, maneuver in any direction, maintain position, and the like. The memory can store "simultaneous localization and mapping" (SLAM) instructions that allow the UAV 200 to autonomously navigate in and around the wheeled vehicle using stereo vision or laser scanning as described above.

In addition, the computer system 210 may be used to execute downloaded instructions that the UAV 200 receives via the communication system 208. Instructions may include inspection programs that direct the UAV 200 to maneuver to a plurality of inspection points on the wheeled vehicles and conduct testing of the inspection point. Instructions may include remote controlled driver instructions that direct the UAV 200 where to navigate. Other instructions may relate to the UAV 200 serving as a backup camera while the wheeled vehicle is operating in reverse.

The camera 216 can be one of the many cameras used in UAVs 200. The camera 216, for example, can be capable of taking video images that are displayed on a human machine interface described below and for zooming in and out. The camera 216 may be mounted on a gimbaled support on the UAV 200 that can allow the camera to rotate 360° horizontally and up to 180° of elevation.

The communication system 208 utilizes wireless communication. Wireless communication includes, for example, radio frequency, Bluetooth, Wi-Fi, or any combination thereof. As is well-known, a communication system uses a transceiver to transmit and receive radio frequency signals. The signals carry instructions the communication system 208 of the UAV 200 and the controller and human machine interface of the wheeled vehicle. The communication system 208 is used to receive instructions from the driver via the human machine interface that may relate to the UAV 200 navigation and operation of the UAV 200's onboard instruments 212, such as directing the camera 216 to point in a particular direction. The UAV 200 also uses the communication system 208 to send video images and other information from the onboard instruments 212 to the human machine interface via the controller.

The battery system 214 may employ a high power battery low in weight, such as, but not limited to, lithium ion, lithium polymer, or lithium sulfide.

Figure 3:
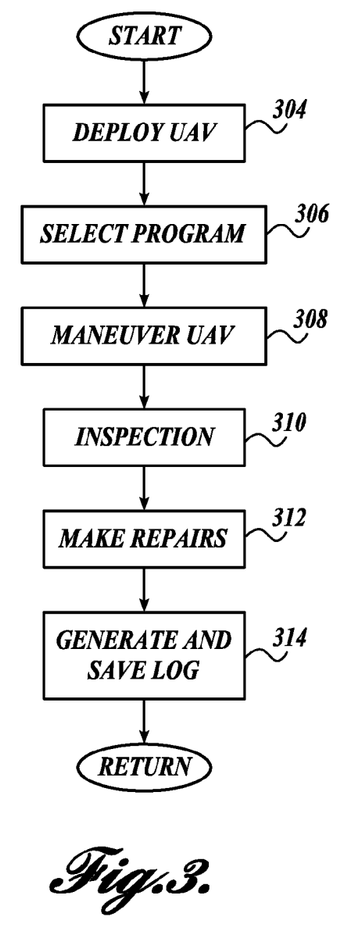
FIG. 3 is a flow diagram showing one embodiment of a method of using a UAV for pre-trip inspections of a wheeled vehicle.

Referring to FIG. 3, one embodiment of a method for conducting a pre-trip inspection of a wheeled vehicle, such as a tractor trailer combination, with a UAV 200 is illustrated. In block 304, the method calls for deploying the UAV 200. Deploying the UAV 200 as used herein means that the UAV 200 takes flight when deployed. The method may include determining that the wheeled vehicle is in a parked condition by checking whether a gear sensor indicates the transmission is in "park." The UAV 200 may be stored on the tractor, such as in UAV storage bay 115, or within the trailer and may travel with either the tractor or trailer. In other situations, it is possible to keep a fleet of UAVs 200 at warehouses, distribution centers, or large retail stores. These locations may experience a high volume of tractor trailer traffic, thus making UAVs 200 an attractive option for pre-trip inspections at these locations. In one embodiment, the UAV 200 can be deployed by the driver of the wheeled vehicle to be inspected. In other cases, a non-driver may be designated as a person responsible for conducting pre-trip inspections. The deployment method can be via the use of a remote start button or by the use of a start button on the UAV 200. There can be interlocks on the UAV 200 that can prevent deploying of the UAV 200. For example, the UAV 200 may first undergo a number of internal checks to ensure that battery power, communications, and all other systems of the UAV 200 are functional.

Block 306 is for selecting an inspection program. Block 306 is an optional step. However, if the UAV 200 is operating autonomously, an inspection program can provide instructions to the UAV 200 relating to each inspection point, the location of each inspection point, the instrument used to test the inspection point, and the conditions that are required to pass inspection. The driver may select an inspection program from a list of programs if the driver desires the UAV 200 to maneuver autonomously. For example, the human machine interface can present to the driver a menu of options. The human machine interface may allow the driver to select the type of wheeled vehicle, for example or a specific tractor or trailer. The inspection program will then list the inspection points to be inspected based on the driver selections.

If the UAV 200 is a remotely operated UAV 200, as opposed to autonomous, this step may be omitted. If the UAV 200 is remotely operated, the driver navigates the UAV 200 to each inspection point and then may use the camera 246, for example, to confirm the inspection point is operational. An inspection point relates to a condition affecting whether the wheeled vehicle is in a drivable condition. An inspection point is a feature of the wheeled vehicle that is required to meet a minimum threshold of operability; otherwise the wheeled vehicle may not be drivable, because the state or condition of the inspection point poses a hazard or danger when driving. For example, non-operational headlights, tail-lights, and turn signal lights are some examples of non-operational inspection points that clearly dictate that the wheeled vehicle is not in a drivable condition.

Figure 6:
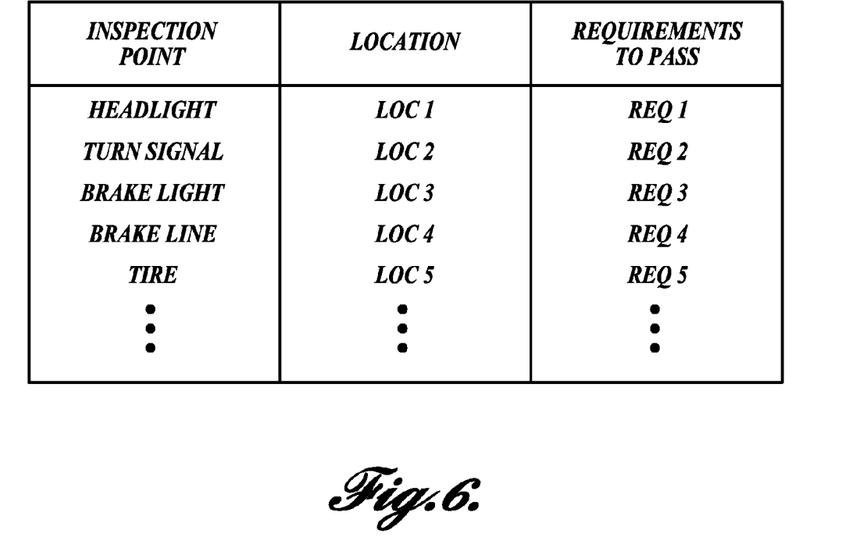
FIG. 6 is a schematic diagram of an inspection program.

A number of different inspection programs can be stored in a memory either onboard the UAV 200 or at a remote location in a controller as described below. FIG. 6 shows one embodiment of the information in an inspection program. The inspection program is, of course, in a language so that it may be understood by the UAV 200 onboard computer processor 210. The selected inspection program can have instructions that the UAV 200 can use to identify each inspection point, the location of the inspection point, and the requirements to pass inspection for each inspection point. Each different type of wheeled vehicle can have its own inspection program with different inspection points and the requirements to pass. The inspection program may also allow the driver to input notes or comments with regard to each inspection point. All the information can then be stored, date-stamped, and logged as a record of the inspection.

Referring to FIG. 1, inspection points may include, but are not limited to, each headlight 108, taillight 116, turn signal light 114, tire 112, mirror 105, brake and brake fluid lines 120, 122. Additional inspection points may include tire threads, gauges, chemical hazard signs or any government mandated signs, flat bed tie downs, door locks, gas tanks, gas tank caps, oil tanks, refrigeration lines, coupling units, and the like. Other inspection points will become apparent to one skilled in the art. Further, the inspection points will change depending on the type of wheeled vehicle. Currently, inspection point lists can be procured for many types of wheeled vehicles.

Block 308 is for maneuvering the UAV 200 to an inspection point. Either before or after deploying the UAV 200, the UAV 200 can be programmed to autonomously maneuver to each inspection point sequentially. Alternatively, the pilot (driver) may pilot the UAV 200 to each inspection point sequentially. If the UAV 200 is autonomously navigated, instructions will have been programmed that direct the UAV 200 on navigating to the inspection point and the requirements for passing. The program may, for example, define a map of all the inspection points for the selected program. The inspection programs can be selected from a library of programs stored remotely or on the UAV 200's onboard computer. When the UAV 200 is remotely navigated by the driver, the driver can control the order of inspection points. For example, the driver can use the human machine interface that displays a list of inspection points. The driver may use the list to navigate to each inspection point that is displayed on the screen. When the UAV 200 is to be flown autonomously, the human machine interface will allow the driver to input a wheeled vehicle type or model. Once the wheeled vehicle type is inputted, an inspection report can be generated and displayed that lists the inspection points, the location in terms so that the UAV 200 can navigate to each, and the requirements for passing. Instructions will be sent to the UAV 200, and the UAV 200 will carry out a set of instructions for maneuvering to the inspection point.

Block 310 is for performing inspection. Once the UAV 200 navigates to an inspection point, the UAV 200 or driver will decide what is required for the inspection point to pass. In some embodiments, a visual confirmation by the driver using the human machine interface display is all that will be needed to pass inspection. In other embodiments, an onboard instrument of the UAV 200 can be used to determine whether the inspection point passes. For example, oil or fuel leaks could be detected via the use of gas detectors. Infrared sensors could be used to detect cracks or cuts in tires or metal parts. In other embodiments, the UAV 200 can simply present a visual image to the driver, and the driver can determine from the image whether the inspection point is operational or not. For example, the driver may use the camera 216 to determine whether there are any cracked, loose, or missing items, spills, leaks, and the like.

In other embodiments, the driver can be interactively involved in determining whether an inspection point passes inspection. For example, in the case of the inspection of headlights, taillights, brake lights, and turn signals, the inspection program may communicate a message to the driver via the human machine interface for the driver to turn on lights one at a time. When a signal is received by the UAV 200 that the light switch is in the on position, the UAV 200 will then record whether or not the light is operational. The UAV 200 may, for example, have light sensors that not only confirm the on and off status of the light, but can also indicate the intensity. In the case of inspection points such as oil or fluid lines, the UAV 200 may maneuver to the inspection point and use a video camera 216 to relay images to the driver in the cab. For example, the UAV 200 can maneuver to the individual brake lines and the driver can view the lines from inside the cab. The driver can interactively request via the human machine interface, the UAV 200 to perform one or more instrument tests.

Each inspection point will have a different requirement for passing to render the wheeled vehicle suitable for driving. Each time when the UAV 200 or the driver has confirmed that the inspection point passes inspection, the UAV 200 or the driver may log the inspection result and move on to the next inspection point. In the case where the inspection point does not pass inspection, the UAV 200 or the driver will also log the failed inspection.

In block 312, in the case where an inspection point fails to qualify as operational, several options may be presented to the driver. One option might be for the driver to cure the problem immediately. In some embodiments, the UAV 200 may diagnose the problem and communicate the diagnoses to the driver via the display of the human machine interface. For example, in the case of lights, the UAV 200 may send a message that the light is either burned out or too dim. Additionally, a controller may provide both a diagnosis and a suggested repair to the driver via the human machine interface, or the controller may simply state the problem with the inspection point. Once the driver has implemented a repair, the UAV 200 may be commanded to return to the failed inspection point for re-testing. Another option is to complete the entire list of inspection points and, at the end, generate a report listing the inspection points that are operational and the inspection points that fail to pass operational. The repairs can then be implemented by mechanics or the driver, depending on the nature of the repair. When all the repairs are completed, the driver may elect to re-run the inspection program in whole or only for the inspection points that failed.

In block 314, once all the inspection points are confirmed to be operational, the driver may log the completion of the pre-trip inspection. The log is dated and saved to memory. The log may include the pass/fail status of each inspection point, any corrective actions taken, re-test results, and the driver responsible for the inspection or corrective action. The wheeled vehicle may have interlocks that prevent the wheeled vehicle from being started or driven until all the inspection points have been confirmed operational. For example, a switch on the ignition system can prevent ignition of the engine until a signal is received confirming that all the inspection points have been confirmed operational. If all the inspection points pass operational, the engine of the wheeled vehicle may be started and the wheeled vehicle may be driven. In some conditions, the engine may be started and the wheeled vehicle driven when not all inspection points pass. For example, the wheeled vehicle may need to be driven to a repair garage, or the failed inspection point only warrants that caution be exercised, such as maintaining a speed below a certain threshold, or the inspection point should be monitored, but has not yet failed.

Figure 4:
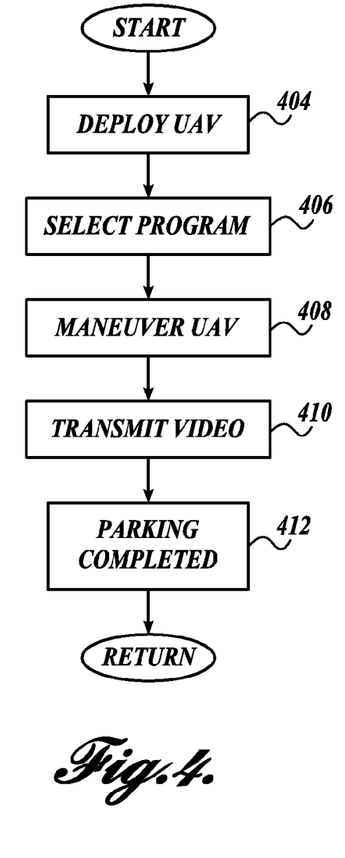
FIG. 4 is a flow diagram showing one embodiment of a method of using a UAV for backup assist of a wheeled vehicle.

FIG. 4 illustrates another embodiment of a method for the use of the UAV 200 with a camera to assist drivers of wheeled vehicles when backing up in reverse.

In block 404, the UAV 200 can be deployed to take flight when provided with instructions inputted by the driver of the wheeled vehicle via the human machine interface. As in the embodiment of FIG. 3, the UAV 200 can be stationed with the wheeled vehicle or at a destination or point of origin, such as distribution warehouses or retail stores. The backup mode of the UAV 200 can be engaged when the driver needs to drive in reverse.

In block 406, the driver may select a navigation program from a list of programs if the driver desires the UAV 200 to maneuver autonomously. For example, the human machine interface can present to the driver a menu of options, each of which provides different maneuvering instructions for the UAV 200. At any time, however, the driver may select to be in remote driver control of the UAV 200. Before or after the UAV 200 is deployed, the UAV 200 may receive instructions via the communication system on how the UAV 200 is to maneuver.

As in the embodiment of FIG. 3, the UAV 200 can be able to visually recognize its environment, identify its location, identify objects and maneuver in a manner that avoids the objects, and can either maintain position or maintain position with respect to a certain object. The UAV 200 can also be instructed to maneuver to various positions while the wheeled vehicle is operating in reverse. As in the embodiment of FIG. 3, the UAV 200 may use stereo vision cameras to identify its environment to allow autonomous navigation. In one embodiment, a program may instruct the UAV 200 to maintain a fixed position. For example, the UAV 200 may station itself at a predetermined location, such as above a loading dock where the UAV 200 may aim a camera 216 so that the end of the wheeled vehicle is within the field of view of the camera 216. Because the camera 216 is directed at the end of the wheeled vehicle, the vehicle does not leave the field of view, and the UAV 200 does not have to move from its position. The camera 216 aimed at the wheeled vehicle may have zoom-in and zoom-out capabilities, so that the field of view can be adjusted. The driver can view the camera images within the cab via the display of the human machine interface.

In other embodiments of the maneuvering program, the UAV 200 can be instructed to maintain a fixed position in elevation or azimuth. For example, the UAV 200 can be stationed to the side of the wheeled vehicle, such as a position midway between the wheeled vehicle and the loading dock. The UAV 216 camera can pan horizontally to keep the wheeled vehicle in the field of view as the wheeled vehicle is backed up. The camera 216 images may be presented to the driver via the display on the human machine interface.

In other embodiments of the maneuvering program, the UAV 200 can be instructed to maintain a certain distance or azimuth with respect to a moving point. For example, the UAV 200 can maintain a constant elevation and distance to the end of the wheeled vehicle as the vehicle is backing up. Because the UAV 200 can recognize and identify objects, the camera 216 can automatically aim itself at the end of the wheeled vehicle, for example, so that the camera 216 does not lose sight of the end of the trailer, which would cause the driver to make continual manual adjustments.

In other embodiments of the maneuvering program, the UAV 200 can be instructed to fly in a predetermined flight pattern. For example, the UAV 200 may be programmed to fly in a back-and-forth pattern while the wheeled vehicle is engaged in reverse while maintaining the wheeled vehicle within the field of view of the camera 216.

In other embodiments of the maneuvering program, the UAV 200 can be in constant motion during the backing up operation. For example, the UAV 200 can be instructed to maneuver from the left side to right side of the wheeled vehicle while in reverse. This gives the driver additional viewing angles that might be necessary in tight spaces.

In other embodiments of the maneuvering program, the driver can use a combination of remote driver control and autonomous control. For example, the driver can be provided with a menu of items that instruct the UAV 200 where and how to maneuver. The driver can be presented with a menu of selections, such as elevation, right side view, left side view, top view, underneath view, and the like. The human machine interface may also include one or more "joysticks" that are used to maneuver the UAV 200.

In some or all of the embodiments, the camera 216 that provides images to the driver via the human machine interface may employ a wide-angle lens to ensure as wide a field of view as possible. The camera 216 can pan in two axes, and the camera 216 may have zoom in and zoom out capabilities. The UAV 200 may also have a night vision camera to allow the driver to back up in low or no light conditions. Additionally, the UAV 200 can have a spotlight to light areas that are not being lighted by the wheeled vehicle's lights. For example, the UAV 200 can even maneuver underneath the wheeled vehicle to give views in close proximity to the ground and underneath the wheeled vehicle.

In block 406, the driver can also have menu options to select the type of tractor or trailer so that one of a plurality of backing up programs can provide instructions to the UAV 200 particular to the type of wheeled vehicle.

In block 408, the UAV 200 carries out the maneuvering instructions to position itself autonomously using stereo vision location technology in accordance with the maneuvering program selected in block 406. Alternatively, the driver can input remote control instructions to position the UAV 200 in any desired location advantageous to the driver. Once in a stationary position, the driver can control the camera 216 and can direct the viewing angle of the camera 216 to a desirable direction via the human machine interface.

Block 410 is for transmitting images from the UAV camera 216 to a display on the human machine interface. The UAV camera 216 image signals are sent via wireless communication to a controller, which then communicates to the human machine interface. The human machine interface display, may, in addition to images relayed by the camera 216, also display visual aids as well. The display can overlay certain information on top of the images. For example, the visual aids can include distances to objects seen in the image. The UAV 200 can be equipped with ultrasonic sensors for determining distances to objects. Detecting distance to objects using ultrasonic signals is well known to one skilled in the art. The display can also simultaneously indicate speed and proximity to objects.

In block 412, backing up of the wheeled vehicle in reverse is completed, and the UAV 200 may return to the storage bay.

Figure 5:
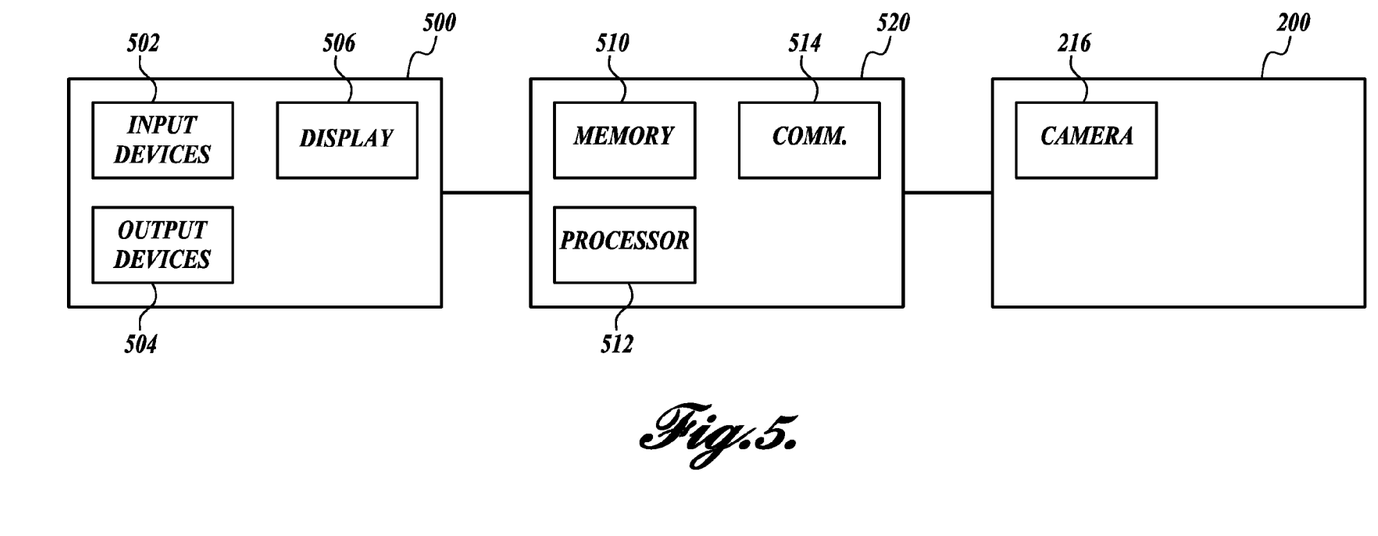
FIG. 5 is a schematic diagram of human machine interface and controller.

Referring to FIG. 5, a representative embodiment of the human machine interface 500 ("HMI") discussed above is illustrated. The human machine interface 500 is used by the driver to communicate to and remotely pilot the UAV 200 by sending instructions to the UAV 200 via a controller 520. The human machine interface 500 is also used for displaying images on the electronic display device 560 from the UAV 200 as well as other information. The human machine interface 500 may reside within the cab 100. A human machine interface 500 may include any of a number of input devices 502, such as toggle switches, joysticks, push button switches, potentiometers, touchscreen displays, or the like. The input devices 502 can generate signals that are interpreted by the controller 520 to perform a certain activity. Likewise, the controller 520 receives signals from the UAV 200 that the controller 520 interprets as visual images to display on the human machine interface 500 or for other functions. The cab mounted human machine interface 500 also includes various output devices 504, such as visual output devices (e.g., lights, displays, gauges), audible output devices (e.g., speakers, headphones, etc.), and haptic feedback devices. The display 506 can be a liquid crystal display (LCD), a light emitting polymer display (LPD), or the like, for displaying content (e.g., camera images, instructions, instrument readings, and the like) to the driver. One or more input devices 502 and/or output devices 504 may be stand-alone, integrated with the instrument panel, with a rear view mirror or a side view mirror, mounted in, on or over a hood of the wheeled vehicle, and/or located and/or integrated with any other suitable structure in the wheeled vehicle.

As used herein, instructions for carrying out general or specific operations can be implemented in hardware components, such as analog circuitry, digital circuitry, processing units, or combinations thereof, or software components which can be processed by the processing units, etc. Therefore, as used herein, the term "instructions" can be used to generally describe these aforementioned components, and can be either hardware or software, or combinations thereof, that implement logic for carrying out the various aspects of the present disclosure.

The controller 502 is provided on the wheeled vehicle. The controller 502 is in communication with the human machine interface 500. The controller 502 also communicates wirelessly with the UAV 200. An embodiment of the controller includes a memory 510 with a Random Access Memory ("RAM"), an Electronically Erasable, Programmable, Read-Only Memory ("EEPROM"), and any other suitable data storage device, a processor 512, and one or more programs for providing instructions to carry out methods according to FIGS. 3 and 4, for example. The processor 512 and memory 510 of the controller 520 are connected by an input/output (I/O) interface to the human machine interface 500. The controller 520 also includes a communication system 514 to communicate to and from the UAV 200.

When the UAV 200 is operated by a remote pilot (driver), the communication system 514 should be capable of handling communications with a fast response time. As a communication system, wireless communication can be employed. Wireless communication includes, for example, radio frequency, Bluetooth, Wi-Fi, or any combination thereof. As is also well-known, wireless communication uses a transceiver to send and receive signals of a certain radio frequency and amplitude. The communication system 514 allows a remote pilot to maneuver the UAV 200, transmit real-time video images from the UAV camera 216 to the human machine interface 500, transmit information from any of the UAV instruments 212 to the human machine interface 500, and download any instructions and programs from the controller 520 to the UAV 200. Such instructions to the UAV 200 may include, but are not limited to, inspection programs, maneuvering programs, and other instructions relating to the navigation and maneuvering of the UAV 200 and the operation of any instruments 212 including the camera 216.

In the embodiment shown in FIG. 5, the memory 510 stores inspection programs for generating navigation maps, which are then used by the UAV 200 to navigate to the various inspection points listed in the inspection program. The inspection program also includes the requirements to pass inspection. The memory 510 also stores maneuvering programs that instruct the UAV 200 where and how to maneuver while the wheeled vehicle is operating in reverse. The inspection and maneuvering programs can be permanently stored on memory 510 or any associated computer readable media, such as flash memory, CD/DVD, etc. Other data, including whether inspection points pass or fail and any driver-entered notes or comments, may also be stored locally in the memory 510. Data received from the UAV 200 can also be stored in memory 510.

In some embodiments, the controller 520 may additionally receive data from one or more sensors located on the wheeled vehicle. The sensors can be in communication with the controller 520 directly through a wired or wireless link and/or indirectly through a vehicle-wide network. The sensors may include various vehicle system sensors including, but not limited to, brake sensors, a throttle sensor, an accelerator pedal position sensors, tire pressure sensor, vehicle inertial sensor(s), fuel flow sensors, fuel tank level sensors, wheel speed sensors, an engine speed sensor, a vehicle speed sensor, a transmission gear sensor, temperature sensors, accelerometers, vehicle passenger load and/or payload sensors, etc. The sensors can be used in making decisions on how to operate or maneuver the UAV 200. For example, the gear sensor may be used to indicate to the UAV 200 that the backup mode is in operation when the wheeled vehicle is in reverse gear. The gear sensor may also be used to indicate to the UAV 200 that the wheeled vehicle is parked, and that the parking brake is engaged, for operation in the pre-trip inspection mode.

In some embodiments, the input devices 502 of the human machine interface may include an ON/OFF controller knob, a joystick for UAV altitude control, a joystick for UAV direction control, a scroll wheel, and a start UAV 200 button. In that regard, the scroll wheel can be coupled with the processor 512 so that depressing the buttons of the scroll wheel causes activation of menu items and selection of virtual buttons on the electronic display 506, selects controls, or otherwise interacts with graphical elements that are presented on the electronic display 506 to provide input. In one embodiment, the scroll wheel can interact with a virtual QWERTY keyboard or alphanumeric keypad displayed on the display 506 for inputting driver responses.

In one embodiment, the electronic display 506 may also be configured as an input device for receiving commands from the driver to be processed by the controller 520. In one embodiment, the display 506 may include a touch sensitive layer on the screen that is configured to receive input from the driver. In typical embodiments, the touch sensitive layer is configured to recognize a user's touches applied to the surface of the layer. For example, the position of the touches, the pressure of the touches, general direction of the touches, and the like are recognized by the touch sensitive layer.

Thus, the human machine interface 500 and controller 520 enable the driver and the UAV 200 to exchange information. As those skilled in the art will appreciate, the human machine interface 500 outlined above is meant to be representative and to not reflect all possible components of a human machine interface 500 that may be employed.

Based on the foregoing description, a backup system for a wheeled vehicle includes a wheeled vehicle comprising a cab; an unmanned aerial vehicle comprising a camera; a controller configured to communicate to and from the unmanned aerial vehicle while in flight; a human machine interface within the cab, wherein the human machine interface is configured to communicate with the controller; and an electronic display device within the cab configured to display visual images sent from the unmanned aerial vehicle while in flight, and the controller is further configured to transmit input signals received via the human machine interface to the unmanned aerial vehicle; and wherein the unmanned aerial vehicle is configured to maneuver autonomously or under driver remote control based on the input signals received from the human machine interface, and wherein the unmanned aerial vehicle is configured to send real-time video images while in flight from different viewing angles of a rear of the wheeled vehicle during a period when the wheeled vehicle is operating in reverse.

In some embodiments, the unmanned aerial vehicle comprises stereo vision cameras.

In some embodiments, the camera on the unmanned aerial vehicle is configured to be controlled via the human machine interface.

In some embodiments, the unmanned aerial vehicle is configured to maneuver autonomously while in flight.

In some embodiments, the unmanned aerial vehicle is configured to maneuver via driver remote control while in flight.

In some embodiments, the wheeled vehicle comprises a tractor and trailer.

Based on the foregoing description, a method of backing up a wheeled vehicle includes deploying an unmanned aerial vehicle to take flight; maneuvering the unmanned aerial vehicle autonomously or under driver remote control to a rear of the wheeled vehicle; directing a camera onboard the unmanned aerial vehicle to capture images of a rear of the wheeled vehicle; and sending the images from the camera onboard the unmanned aerial vehicle to an electronic display device within a cab of the wheeled vehicle while the wheeled vehicle is operating in reverse.

In some embodiments, the method of backing up a wheeled vehicle further includes displaying on the electronic display device, distances to objects that appear in the images.

In some embodiments, the method of backing up a wheeled vehicle further includes maneuvering the unmanned aerial vehicle to maintain a constant distance to the wheeled vehicle.

In some embodiments, the method of backing up a wheeled vehicle further includes maneuvering the unmanned aerial vehicle to different sides of the wheeled vehicle.

In some embodiments, the method of backing up a wheeled vehicle further includes maintaining the unmanned aerial vehicle at a fixed position, and maneuvering the camera to maintain a rear of the wheeled vehicle within a field of view of the camera.

Based on the foregoing description, an inspection system for a wheeled vehicle includes a wheeled vehicle comprising a cab; an unmanned aerial vehicle comprising a camera; a controller configured to communicate to and from the unmanned aerial vehicle while in flight; a human machine interface within the cab, wherein the human machine interface is configured to communicate with the controller; and an electronic display device within the cab configured to display visual images sent from the unmanned aerial vehicle while in flight, and the controller is further configured to transmit input signals received via the human machine interface to the unmanned aerial vehicle, wherein the unmanned aerial vehicle is configured to maneuver autonomously or under driver remote control based on the input signals received from the human machine interface, and wherein the unmanned aerial vehicle is configured to send real-time video images while in flight of a plurality of inspection points located on the wheeled vehicle when the wheeled vehicle is in a parked condition, and wherein the plurality of inspection points relate to a condition affecting whether the wheeled vehicle is in a drivable condition.

In some embodiments, the wheeled vehicle comprises a tractor and trailer.

In some embodiments, the unmanned aerial vehicle comprises stereo vision cameras.

In some embodiments, the unmanned aerial vehicle comprises one or more instruments selected from infrared detectors, position-determining indicators, altimeters, gas detectors, global positioning systems, range detection lasers, ultrasonic range detectors, radio position detectors, and inertial measurement units.

In some embodiments, the unmanned aerial vehicle is configured to maneuver to the plurality of inspection points autonomously.

In some embodiments, the unmanned aerial vehicle is configured to maneuver to the plurality of inspection points under driver remote control.

Based on the foregoing description, a method for inspecting a wheeled vehicle prior to driving the wheeled vehicle includes parking a wheeled vehicle, deploying an unmanned aerial vehicle to take flight; maneuvering the unmanned aerial vehicle autonomously or under driver remote control to a plurality of inspection points on the wheeled vehicle in sequence; after maneuvering the unmanned aerial vehicle to an inspection point, testing whether the inspection point is operational or not operational; and after testing whether the inspection point is operational or not operational, maneuvering the unmanned aerial vehicle to another inspection point, and, when the inspection points pass inspection, driving the wheeled vehicle.

In some embodiments, the method of inspecting a wheeled vehicle further includes autonomously maneuvering the unmanned aerial vehicle.

In some embodiments, the method of inspecting a wheeled vehicle further includes remotely maneuvering the unmanned aerial vehicle.

In some embodiments, the method of inspecting a wheeled vehicle further includes logging results after testing whether the inspection point is operational or not operational In some embodiments, the method of inspecting a wheeled vehicle further includes preventing ignition of the wheeled vehicle until each of the inspection points is confirmed to be operational.

The principles, representative embodiments, and modes of operation of the present disclosure have been described in the foregoing description and embodiments. However, aspects of the present disclosure that are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

The invention claimed is:

1. A backup system for a wheeled vehicle, comprising:
 a wheeled vehicle comprising a cab;
 an unmanned aerial vehicle comprising a camera;
 a controller configured to communicate to and from the unmanned aerial vehicle while in flight;
 a human machine interface within the cab, wherein the human machine interface is configured to communicate with the controller, and
 an electronic display device within the cab configured to display visual images sent from the unmanned aerial vehicle while in flight, and the controller is further configured to transmit input signals received via the human machine interface to the unmanned aerial vehicle; and wherein the unmanned aerial vehicle is configured to maneuver autonomously or under driver remote control based on the input signals received from the human machine interface, and wherein the unmanned aerial vehicle is configured to send real-time video images while in flight from different viewing angles of a rear of the wheeled vehicle during a period when the wheeled vehicle is operating in reverse.

2. The system of claim 1, wherein the unmanned aerial vehicle comprises stereo vision cameras.

3. The system of claim 1, wherein the camera on the unmanned aerial vehicle is configured to be controlled via the human machine interface.

4. The system of claim 1, wherein the unmanned aerial vehicle is configured to maneuver autonomously while in flight.

5. The system of claim 1, wherein the unmanned aerial vehicle is configured to maneuver via driver remote control while in flight.

6. The system of claim 1, wherein the wheeled vehicle comprises a tractor and trailer.

7. A method of backing up a wheeled vehicle, comprising:
 deploying an unmanned aerial vehicle to take flight;
 maneuvering the unmanned aerial vehicle autonomously or under driver remote control to a rear of the wheeled vehicle;
 directing a camera onboard the unmanned aerial vehicle to capture images of a rear of the wheeled vehicle; and
 sending the images from the camera onboard the unmanned aerial vehicle to an electronic display device within a cab of the wheeled vehicle while the wheeled vehicle is operating in reverse.

8. The method of claim 7, further comprising displaying on the electronic display device, distances to objects that appear in the images.

9. The method of claim 7, further comprising maneuvering the unmanned aerial vehicle to maintain a constant distance to the wheeled vehicle.

10. The method of claim 7, further comprising maneuvering the unmanned aerial vehicle to different sides of the wheeled vehicle.

11. The method of claim 7, further comprising maintaining the unmanned aerial vehicle at a fixed position, and maneuvering the camera to maintain a rear of the wheeled vehicle within a field of view of the camera.

12. An inspection system for a wheeled vehicle, comprising:
 a wheeled vehicle comprising a cab;
 an unmanned aerial vehicle comprising a camera;
 a controller configured to communicate to and from the unmanned aerial vehicle while in flight;
 a human machine interface within the cab, wherein the human machine interface is configured to communicate with the controller; and
 an electronic display device within the cab configured to display visual images sent from the unmanned aerial vehicle while in flight, and the controller is further configured to transmit input signals received via the human machine interface to the unmanned aerial vehicle; and wherein the unmanned aerial vehicle is configured to maneuver autonomously or under driver remote control based on the input signals received from the human machine interface, and wherein the unmanned aerial vehicle is configured to send real-time video images while in flight of a plurality of inspection points located on the wheeled vehicle when the wheeled vehicle is in a parked condition, and wherein each inspection point relates to a condition affecting whether the wheeled vehicle is in a drivable condition.

13. The system of claim 12, wherein the wheeled vehicle comprises a tractor and trailer.

14. The system of claim 12, wherein the unmanned aerial vehicle comprises stereo vision cameras.

15. The system of claim 12, wherein the unmanned aerial vehicle comprises one or more instruments selected from infrared detectors, position-determining indicators, altimeters, gas detectors, global positioning systems, range detection lasers, ultrasonic range detectors, radio position detectors, and inertial measurement units.

16. The system of claim 12, wherein the unmanned aerial vehicle is configured to maneuver to the plurality of inspection points autonomously.

17. The system of claim 12, wherein the unmanned aerial vehicle is configured to maneuver to the plurality of inspection points under driver remote control.

18. A method for inspecting a wheeled vehicle prior to driving the wheeled vehicle, comprising:
- deploying an unmanned aerial vehicle to take flight;
- maneuvering the unmanned aerial vehicle autonomously or under driver remote control to a plurality of inspection points on the wheeled vehicle in sequence;
- after maneuvering the unmanned aerial vehicle to an inspection point, testing whether the inspection point is operational or not operational; and
- after testing whether the inspection point is operational or not operational, maneuvering the unmanned aerial vehicle to another inspection point.

19. The method of claim 18, further comprising autonomously maneuvering the unmanned aerial vehicle.

20. The method of claim 18, further comprising remotely maneuvering the unmanned aerial vehicle.

21. The method of claim 18, further comprising logging results after testing whether the inspection point is operational or not operational.

22. The method of claim 18, further comprising preventing ignition of the wheeled vehicle until each of the inspection points is confirmed to be operational.

\* \* \* \* \*